United States Patent [19]

Smith

[11] 4,390,641

[45] Jun. 28, 1983

[54] FLAME-RETARDANT BENZYLIC-ETHER PHENOLIC MODIFIED FOAM AND METHOD OF PREPARING SAME

[75] Inventor: Stuart B. Smith, Conyers, Ga.

[73] Assignee: Thermocell Development, Ltd., Knoxville, Tenn.

[21] Appl. No.: 336,681

[22] Filed: Jan. 4, 1982

Related U.S. Application Data

[63] Continuation-in-part of Ser. No. 281,290, Jul. 7, 1981.

[51] Int. Cl.³ .................... C08G 18/32; C08J 9/00
[52] U.S. Cl. .................... 521/103; 521/126; 521/127; 521/131; 521/136; 521/177
[58] Field of Search .......... 521/103, 131, 126, 127, 521/136, 177

[56] References Cited

U.S. PATENT DOCUMENTS

| | | | |
|---|---|---|---|
| 2,608,536 | 8/1952 | Sterling | 521/114 |
| 3,242,107 | 3/1966 | Bunge et al. | 521/177 |
| 3,485,797 | 12/1969 | Robbins | 526/71 |
| 4,046,721 | 9/1977 | Austin et al. | 521/177 |

*Primary Examiner*—Morton Foelak
*Attorney, Agent, or Firm*—Richard P. Crowley

[57] ABSTRACT

A method of preparing a flame-retardant benzylic-ether phenolic modified foam product and the resulting foam product produced thereby, which method comprises reacting and mixing benzylic-ether phenol-formaldehyde resin, having a hydroxyl number of from about 400 to 600, with from about 50 to 150 parts by weight of a boric-acid catalyst to each 100 parts of the resin, optionally in the presence of melamine, to form a resin prepolymer, and, thereafter, reacting the prepolymer so formed, in the presence of a blowing agent and an organometal catalyst, with a methylene diisocyanate in an exothermic reaction, to provide a nonfriable, substantially closed-cell, flame-retardant benzylic-ether phenolic modified foam product characterized by substantially acid methylene linkages in the resulting thermosetting foam product.

18 Claims, No Drawings

4,390,641

FLAME-RETARDANT BENZYLIC-ETHER PHENOLIC MODIFIED FOAM AND METHOD OF PREPARING SAME

REFERENCE TO PRIOR APPLICATION

This application is a continuation-in-part of U.S. patent application Ser. No. 281,290, filed July 7, 1981, hereby incorporated by reference. The parent application relates to the preparation of flame-retardant, rigid, thermosetting foam products, by reacting, in the presence of a blowing agent, a catalyst, a furfural-alcohol polymer, a phenol-formaldehyde or benzylic-ether formaldehyde resin, a melamine resin and a methylene diphenyl isocyanate. The reaction provides for a rigid foam characterized by low friability and good heat and flame-resistant properties.

BACKGROUND OF THE INVENTION

Typically, thermosetting foam products are prepared by the use of a phenol-formaldehyde resin, a blowing agent and a strong acid catalyst. Such thermosetting foam products are often characterized by having a fairly brittle foam structure, with low compression strength and exhibiting high friability and brittleness properties. Such phenolic foams, usually have an open-cell foam structure and very little, if any, strength at low densities; for example, below about 2.5 pounds per cubic foot. These phenolic foams are difficult to burn, melt or smoke, in that they are characterized substantially by methylene linkages. However, such phenolic foams are not generally commercially acceptable, because of low compression strength, poor insulation value and the corrosive characteristics of the foam.

Modified phenolic foams have been prepared employing polyisocyanates, to produce a phenolic urethane foam product. For example, U.S. Pat. No. 3,948,824, issued Apr. 6, 1976, hereby incorporated by reference, describes a modified urethane benzylic-ether phenolic foam product. The cellular polymeric reaction product is produced by the reaction of a benzylic-ether phenolic foam in the presence of a liquid methylene diisocyanate-type isocyanate, a blowing agent and amine catalysts, to form a benzylic-ether phenolic urethane foam product. The reaction mixture foams and cures spontaneously in an exotherm into a tough, nonfriable foam. The resulting foam product is closed-cell and has good insulation properties; however, the foam product, because it burns and smokes in a manner very similar to a urethane foam product made from aromatic polyols, does not have commercially acceptable flame-retardant properties, probably due in part to the presence of urethane linkages in the resulting foam mass.

Another difficulty associated with benzylic-ether phenolic urethane foams is that the resulting material is quite reactive, and, therefore, it is difficult to control the nature and extent of the reaction and is difficult to produce the thermosetting foam in a consistently high-quality manner in standard production foaming equipment, due to the very high reactivity of the ingredients.

It would be desirable to prepare a phenolic foam material which provides for a substantially closed-cell ultra low density foam structure of low friability and which exhibits nonburning and nonsmoking characteristics.

SUMMARY OF THE INVENTION

The invention relates to an improved, modified, phenolic thermosetting foam product and to the method of preparing and using the foam product. In particular, the invention concerns a thermosetting foam product prepared by the reaction of a benzylic-ether phenol-formaldehyde resin and reacting the prepolymer in the presence of a weak acid catalyst, to produce a prepolymer with a diisocyanate to provide a modified benzylic-ether phenolic foam product.

It has been discovered that a modified benzylic-ether phenolic aldehyde foam product may be prepared containing substantially methylene linkages and few, if any, urethane linkages in a controlled reaction, by the employment of a weak acid catalyst compound, to prepare a prepolymer, and the subsequent reaction of the weak acid-containing benzylic-ether phenol resin prepolymer with a methylene diphenyl isocyanate compound in the presence of a blowing agent and a catalyst, to produce a phenol modified product. The thermosetting foam product of the invention is not friable or has low friability characteristics, is composed of closed cells or substantially closed cells, and has comparable strength to unmodified urethane foam, without the burning and smoking characteristics and properties of such urethane foam. The resulting foam product, for example, is substantially nonburning and nonsmoking foam with a low density of generally less than 3.0 pounds per cubic foot. The foam product has a flame spread under ASTM E-84 of 10 or less and a smoke value of 40 or less.

The benzylic-ether phenol-formaldehyde modified foam product of the invention is prepared by reacting 100 parts of a substantially anhydrous benzylic-ether formaldehyde resin, typically having a hydroxyl number of greater than 200; for example, 400 to 600, with about 50 to 150 parts by weight per 100 parts of the benzylic-ether resin of a weak acid catalyst, to form a benzylic-ether resin prepolymer. Typically, the reaction is carried out without the use of external heating at a temperature of less than 100° F.; that is, at room temperature 60°–80° F. The resulting prepolymer then is reacted in the presence of a blowing agent and in the presence of a catalyst, to effect the reaction with the isocyanate, typically an organometal catalyst not affected by the acid pH of the prepolymer, with from about 50 to 200 parts by weight of a methylene diphenyl isocyanate (MDI) per 100 parts of the benzylic-ether phenolic resin. The prepolymer MDI reaction produces an exothermic reaction, with the exothermic reaction providing and generating heat to complete further the heat and acid condensation of the benzylic-ether phenol-formaldehyde resin, to produce a thermosetting foam product which comprises substantially methylene linkages and, therefore, having desirable flame spread and smoke properties, but having desirable friability and compression strength properties of a typical phenolic foam.

In one preferred embodiment, it has been found that the reaction to form the weak acid-catalyst benzylic-ether formaldehyde prepolymer should be carried out with mixing of the components of the reaction for at least 6 hours and preferably 8 to 12 hours, e.g., 12 to 24 hours, to provide for a substantially condensed prepolymer with methylene linkages.

Further, the formaldehyde odor of the prepolymer is often quite powerful so that prior to the reaction of the prepolymer with the polyisocyanate to form the modified foam of the invention a sufficient amount of melamine or other amine reactive with formaldehyde should be added to and mixed with the phenolic resin or the prepolymer reaction components to react with all or substantially all of the free formaldehyde of the prepolymer reaction mixture. One mole of melamine is added to about every six moles of free formaldehyde to react the free formaldehyde stoichiometrically and provide a substantially formaldehyde-odor-free foam product. Commercially available benzylic-ether phenol-formaldehyde has about two percent free formaldehyde so that about 2.5 parts of melamine is added to the resin prior to or with the addition of the weak acid catalyst. The amount of melamine to be used often ranges from about 1 to 5 parts per 100 parts of the resin.

In operation, the melamine is added and mixed with the free formaldehyde containing benzylic-ether phenol-formaldehyde resin to react the free formaldehyde, then the weak acid catalyst is added with the blowing agent and other fillers and additives, and the mixture reacted with continuous mixing and blending for 6 to 24 hours to provide a condensed prepolymer. The prepolymer is then reacted with the MDI typically in a foam mixing head wherein the MDI containing the tin catalysts in one stream is intimately admixed with the prepolymer in another separate stream to provide an exothermic foam mixture discharged from the mixing head on a production line.

The method of the invention overcomes the difficulties associated with the preparation of the cellular polymeric masses, as disclosed in the Robbins Pat. No. 3,948,824, in that the reaction is a controlled reaction, by the employment of a weak acid catalyst and the avoidance of the typically strong acid catalyst employed phenolic foams, such as the sulfonic acid catalyst, such as methane sulfonic acid and paratoluene sulfonic acid and similar strong acids which are far too reactive in curing the benzylic-ether phenol-formaldehyde resin. Further, the benzylic-ether phenol-formaldehyde resin comprises a novolak resin which is substantially anhydrous; that is, having less than about 1% by weight water, in order to avoid the intentional creation of urethane linkages, which leads to unacceptable flame and smoke properties in the foam.

The benzylic-ether phenolic resins employed in the present invention are characterized by containing one or more units having the formula:

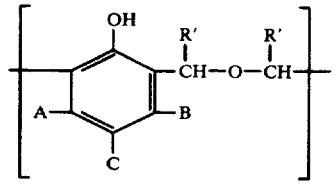

wherein A, B and C are hydrogen, hydrocarbon radicals, oxyhydrocarbon radicals or halogen and R' is individually a hydrogen or a hydrocarbon radical of 1 to 8 carbon atoms. The resins have average degrees of polymerization, as measured by the number of repeating aromatic rings, of 3 to 100, and preferably about 4 to 10. Although higher molecular weight resins are operable in the curing reactions above described, such resins are difficult to handle from the standpoint of viscosity.

The described benzylic-ether resins are condensation polymers of a phenol having the general formula:

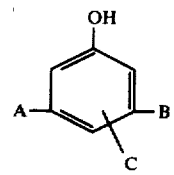

wherein A, B and C are hydrogen, hydrocarbon radicals, oxyhydrocarbon radicals or halogen, with an aldehyde having the general formula R'CHO, wherein R' is a hydrogen or a hydrocarbon radical of 1 to 8 carbon atoms, prepared in the liquid phase in the substantial absence of water at temperatures below about 130° C. in the presence of catalytic concentrations of a metal ion dissolved in the reaction medium. The molar ratio of aldehyde to phenol generally can be varied from 3:1 to 1:1, although some resin is also formed outside these ratios. The preparation and characterization of these resins is disclosed in greater detail in U.S. Pat. No. 3,485,797. In the preferred form, these resins have the general formula:

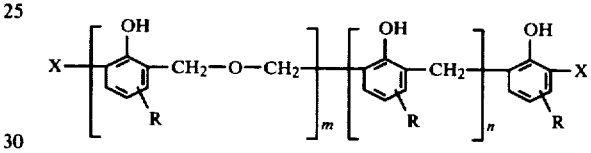

wherein R is a hydrogen or a phenolic substituent meta to the phenolic hydroxyl group, the sum of m and n is at least 2 and the ratio of m to n is at least 1, and X is an end group from the group consisting of hydrogen and methylol, the molar ratio of said methylol-to-hydrogen end groups being at least 1.

The most preferred benzylic-ether resins employed in the resin compositions of the present invention are those in which R is hydrogen. The phenols employed in the formation of the benzylic-ether resins are generally all phenols which have heretofore been employed in the formation of phenolic resins generally, and which are not substituted at either of the carbon atoms ortho to the hydroxyl group. Any one, all or none of the remaining carbon atoms of the phenol ring can be substituted. The nature of the substituent can vary widely, and it is only necessary that the substituent not interfere in the polymerization of the aldehyde with the phenol at the ortho position. Substituted phenols employed in the formation of the phenolic resins include: alkyl-substituted phenols; aryl-substituted phenols; cycloalkyl-substituted phenols; alkenyl-substituted phenols; alkoxy-substituted phenols; aryloxy-substituted phenols; and halogen-substituted phenols, the foregoing substituents containing from 1 to 26 and preferably from 1 to 6 carbon atoms. Specific examples of suitable phenols, aside from the preferred unsubstituted phenol, include: m-crosol; p-crosol; 3,5-xylenol; 3,4-xylenol; 3.4,5-trimethyl phenol; 3-ethyl phenol; 3,5-diethyl phenol; p-butyl phenol; 3,5-dibutyl phenol; p-amyl phenol; p-cyclohexyl phenol; p-octyl phenol; 3,5-dicyclohexyl phenol; p-phenyl phenol; p-crotyl phenol; 3,5-dimethoxy phenol; 3,4,5-trimethoxy phenol; p-ethoxy phenon; p-butoxy phenol; 3-methyl-4-methoxy phenol; and p-phenoxy phenol.

A prepolymer of the benzylic-ether phenol-formaldehyde resin is prepared employing at least 50 parts by weight to 100 parts by weight of the resin of a weak acid catalyst, and often from 50 to 150 parts may be employed. The weak acid catalyst may, for example, be an organic or inorganic weak acid catalyst and should be anhydrous or substantially anhydrous, and typically in powdered form. Representative weak acid catalysts, which may be useful in the practice of the invention, would include, but not limited to: oxalic acid; citric acid; tartaric acid; and boric acid, and combinations thereof. The preferred weak acid catalyst comprises a anhydrous or substantially anhydrous powdered boric acid catalyst.

The boric acid catalyst, in a 1/10th normal solution, provides for a pH of about 5.2 and, in addition to initiating effectively polymerization of the phenolic resin as a prepolymer, also provides and incorporates excellent flame-retardant properties and increases the dimensional stability of the resulting foam product, and raises the upper temperature range of the foam from about 250° F. to 350° F. In the preferred embodiment, the boric acid is employed in an amount ranging from about 50 to 120 per 100 parts of the benzylic-ether resin. It has been found that sodium tetra borate, substituted for a boric acid in the reaction of the invention, is not effective, indicating clearly that the improved flammability and flame-spread properties of the resulting foam are not the result of the borate acting as a flame-retardant agent, but rather indicates the controlled reaction provided by the boric acid and the preparation of foam with substantially methylene, rather than urethane, linkages. The use of the borate resulted in a phenolic foam which burned and smoked and had high friability and an unacceptable K factor, due to the open-cell nature of the resulting foam.

The preparation of the thermosetting foam product is carried out in the presence of a catalyst, which catalyst should not be affected by the acid environment of a low pH; that is, one which is not hydrolyzed in an acid environment. The catalyst employed is in an amount sufficient to effect the complete cure, cross-linking or condensation of the reactant, to provide for the rigid urethane modified foam product. The catalyst should provide for the condensation of the resulting phenolic resin, as well as reaction of the diisocyanate with the hydroxyl groups of the prepolymer. It has been found that organometallic catalysts, such as cadmium, tin and the like; for example, those catalysts, or accelerators, are used as urethane foam-type catalysts, particularly catalysts used as trimerization catalysts for polyisocyanurate foams, may be employed in the practice of the invention. For example, a suitable organometallic catalyst may comprise alkyl fatty acid, metal catalyst, such as a tin catalyst, such as stannous octoate, dibutyl tin dilaureate and similar type catalysts. The catalysts may be employed in an amount sufficient to effect the condensation reaction and typically ranges from about 0.05 to 10 parts per 100 parts of the benzylic-ether resin; for example, 0.5 to 5 parts.

The reaction is carried out in the presence of a blowing agent, and typical blowing agents which may be employed include physical and chemical blowing agents, as well as mechanical blowing techniques. However, the preferred blowing agent and technique comprise the employment of liquid physical blowing agents which are volatile liquids introduced into the reaction mixture, and which produce a blowing gas, through vaporization of the blowing agent or through decomposition of the blowing agent during the exotherm of the reaction. Suitable blowing agents are shortcyain aliphatic hydrocarbons; for example, in the $C_3$–$C_7$ range, and their chlorinated and fluorinated analogs, such as the fluoro and chloro alkanes known as Freon (a registered trademark of E. I. du Pont de Nemours & Co.), methylene chloride and similar blowing agents. The blowing agents may be employed in amounts ranging from 0.5 to 50 parts; for example, 1 to 10 parts, per 100 parts by weight of the phenol resin employed in the reaction mixture.

It is usually also desirable to provide a small, but effective, amount of surfactant to act as a cell-control or nucleating agent, to produce a uniform, fine cellular structure to the resulting rigid foam. Typical surfactants employed would include, but not be limited to, silicone surfactants in an amount generally of from about 0.15 to 5 parts by weight; for example, 0.1 to 2 parts by weight, of the surfactant to 100 parts by weight of the phenol resin in the reaction mixture. Typical silicone surfactants which may be employed include those nonhydrolyzable silicone surfactants, such as those described in U.S. Pat. Nos. 3,772,224 and 3,849,156, and those polyalkylene glycol silicones and dimethyl silicone surfactant and block copolymers commonly employed in foam preparation.

Optionally, if desired, a wide variety of other chemicals, additives, fillers, property enhancers and reinforcers may be incorporated in the resinous reaction mixture, such as, for example, antioxidants, stabilizers, antistatic agents, biocides, dyes, fibers, fillers, particles, clays, flame retardants, fungicides, heat stabilizers, lubricants, plasticizers, viscosity-control agents, ultraviolet absorbers and other additives.

The polyisocyanate useful in the invention comprises polyisocyanates having 2 to 5 isocyanate groups and typically a methylene diphenyl isocyanate, such as toluene diisocyanate, or mixtures of isocyanates, such as those of the Robbins patent. The isocyanates may be employed alone or in combination or as prepolymers with excess isocyanate, such as in the Robbins patent. Typically, the average functionality of the isocyanate would range from 2.4 to 3.2. The isocyanates are employed typically in a range of from about 50 to 200 parts by weight of the isocyanate per 100 parts of benzylic-ether phenolic resin; for example, 70 to 120 parts per 100 parts of the benzylic-ether resin.

The modified thermosetting foam of the invention is prepared by, firstly, reacting the substantially anhydrous benzylic-ether phenol-formaldehyde resin with melamine and with the weak acid, such as the anhydrous boric acid powder, to institute prepolymerization at a pH range of from 4.5 to about 6.5 and typically from about 5 to 5.6. The reaction mixture is then mixed with a silicone surfactant as a cell-control agent, the liquid blowing agent, such as Freon, and the tin catalyst which is not affected by the low pH employed in the reaction mixture. The reaction mixture is then reacted with mixing to provide the prepolymer which is reacted with the methylene diisocyanate, to cause an exotherm and to produce a closed-cell, low-friability, low-density foam with good smoke and burning characteristics.

It has been found that if the same procedure is repeated with a resole resin; that is, one containing water, no reaction takes place, since the MDI in the water and the resole resin react. The employment of the weak acid catalyst, such as boric acid, provides for a controlled reaction, and strong acids, which would lead to a lower pH and a very vigorous, uncontrolled reactive product, such as sulfonic acid, should be avoided. Because of the lower pH of the resin mixed, after the addition of the boric acid, the reactivity of the benzylic-ether resin prepolymer is slowed down, so that it is much easier to handle on a continuous foam machine, unlike the modified urethane foam resin system of the Robbins patent, wherein the presence of low pHs and formic acid leads to a very reactive system, which is difficult to handle with conventional foam equipment.

My invention will be illustrated with reference to certain specific examples and embodiments; however, it is recognized that various changes and modifications may be made in the formulations and practice of my invention, as described hereinafter, all within the spirit and scope of my invention.

DESCRIPTION OF THE EMBODIMENTS

EXAMPLE 1

A thermosetting phenolic foam product was prepared by mixing together the following ingredients as shown:

| Ingredients | Parts by Weight |
| --- | --- |
| 1. Benzylic-ether phenol-formaldehyde resin #220-000 (Ashland Chemical Co.) - hydroxyl number 525 ratio phenol/formaldehyde 1.5 water less than 0.5% | 100 |
| 2. Blowing agent - trichlorofluoromethane (Freon-11 (du Pont)) | 25 |
| 3. Catalyst - triethanol amine (TEA) | 0.3 |
| 4. Silicone surfactant - DC-193 (Dow Corning Co.) | 2 |
| 5. Flame retardant - chlorinated (Thermolin 101 (Olin Corp.)) | 10 |
| 6. Methylene diphenyl diisocyanate (MDI) (Rubicon XI-171) | 125 |
| Cream Time | 6 seconds |
| Tack free time | 30 seconds |
| Cure time | 90 seconds |
| Flame spread (E-84) | 25 |
| Smoke | 250 |
| Density | 2.0 psi |
| Compressive strength | 30 psi |
| K factor | .125 |

The resulting foam prepared in accordance with the disclosure of the Robbins patent is surface-friable.

EXAMPLE 2

A thermosetting phenolic foam product was prepared by mixing together the following ingredients as shown:

| Ingredients | Parts by Weight |
| --- | --- |
| 1. Benzylic-ether phenol-formaldehyde resin #220-000 | 100 |
| 2. Boric acid (anhydrous powder) | 75 |
| 3. Blowing agent - Freon 11 | 25 |
| 4. Silicone surfactant DC-193 | 2 |
| 5. Organo metallic catalyst - stannous octoate | 2 |
| 6. MDI (Rubicon XI-171) | 100 |
| Cream time | 20 seconds |
| Tack free time | 60 seconds |
| Cure time | 90 seconds |
| Density | 1.6 pcf |
| Compressive strength | 20 psi |
| K factor | .125 |
| E-84 flame spread | 5 |
| Smoke | 15 |

The thermosetting modified foam of the invention provided a closed-cell foam with good compressive strength and low smoke and flame-spread properties (as measured by ASTM E-84 tunnel test). The same formulation used with a water-containing phenol-formaldehyde resole resin provides a friable foam of very low or no strength and with a density of 4.0 pcf. The use of an alkaline catalyst, such as an amine catalyst, will not be effective, since the acid of the resin mixture will render the catalyst ineffective. An exotherm occurs on the addition of the isocyanate, which increases the acid reactivity of the phenolic resin, so that both condensation and polymerization occur in the reaction mixture, providing a foam with substantially methylene bridges connected with other methylene bridges, which provides excellent flame and smoke properties to the foam.

It has also been found that the above formulation, when mixed for a short period of time, provides mixture having a white, creamy texture; however, on continuous mixing for long periods of time, such as 12 hours, the mixture has a bluish coat or color with condensed water on the wall of the mixing vessel, providing a substantially reacted prepolymer with methylene linkages. The use of melamine, either to the phenolic ether or to the reacted prepolymer, removes the free formaldehyde odor. The long-mixed prepolymer reacted with MDI on the formulation produces a low-density foam with low smoke and flame spread values, yet with good compressive strength and good friability. The foam is suitable for use as insulation and other uses for closed-cell low-density foam products.

What is claimed is:

1. A method of preparing a nonfriable, closed-cell, benzylic-ether phenol-formaldehyde modified thermosetting foam product characterized by a low flame spread and smoke properties, which method comprises:
    (a) reacting, under substantially anhydrous conditions, 100 parts of a benzylic-ether phenol-formaldehyde resin, having a hydroxyl number of greater than about 200, with from about 50 to 150 parts by weight per 100 parts of the benzylic-ether phenol-formaldehyde resin in the presence of a weak acid catalyst at a pH of from about 4.0 to 6.5, to form a benzylic-ether phenol resin prepolymer; and
    (b) reacting the prepolymer, in the presence of a blowing amount of a blowing agent to form a foamable mass, and a catalytic amount of an organometallic catalyst, which is not affected by the pH of the prepolymer, with from about 50 to 200 parts by weight of a methylene diphenyl polyisocyanate in an exothermic reaction, to provide for the further heat and acid condensation of the phenolic resin prepolymer and the reaction of the isocyanate with the prepolymer, to produce a low-friability, substantially closed-cell, phenolic modified thermosetting foam product composed substantially of acid methylene linkages.

2. The method of claim 1 wherein the weak acid catalyst comprises boric acid.

3. The method of claim 1 wherein the weak acid catalyst comprises from about 50 to 120 parts by weight of a powdered boric acid catalyst.

4. The method of claim 1 wherein the blowing agent comprises a liquid fluorocarbon.

5. The method of claim 1 wherein the organometal catalyst comprises a fatty acid tin catalyst.

6. The method of claim 1 wherein the reaction is carried out at a pH of from about 5.0 to 5.7.

7. The method of claim 1 wherein the methylene diphenyl polyisocyanate comprises toluene diisocyanate.

8. The method of claim 1 wherein the benzylic-ether phenol-formaldehyde resin has a hydroxyl number ranging from about 400 to 600.

9. The method of claim 1 which includes mixing the benzylic-ether phenol-formaldehyde resin and weak acid catalyst to form the prepolymer for a period of at least 6 hours.

10. The method of claim 1 which includes adding sufficient melamine to react with substantially all of the free formaldehyde of the phenolic-formaldehyde resin.

11. The method of claim 1 which includes adding from about 1 to 5 parts by weight of melamine per 100 parts of the resin to the prepolymer.

12. The method of claim 1 wherein the methylene diphenyl polyisocyanate has an average functionality of from 2.4 to 3.2.

13. The method of claim 1 wherein the weak acid catalyst is selected from the group consisting of oxalic acid, citric acid, tartaric acid and boric acid, and combinations thereof.

14. The method of claim 1 wherein the benzylic-ether-phenol formaldehyde resin has the structural formula:

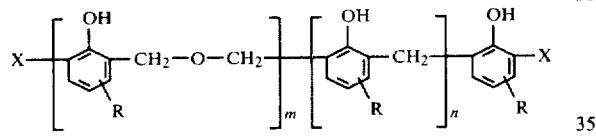

wherein R is a hydrogen or a phenolic substituent meta to the phenolic hydroxyl group, the sum of m and n is at least 2 and the ratio of m to n is at least 1, and X is an end group from the group consisting of hydrogen and methylol, the molar ratio of said methylol-to-hydrogen end groups being at least 1.

15. The method of claim 1 which includes reacting the resin with the weak acid catalyst at a temperature of less than about 100° F.

16. The method of claim 1 which includes adding an amine reactive with formaldehyde to the prepolymer to react with free formaldehyde in the prepolymer.

17. A method of preparing a nonfriable, closed-cell, benzylic-ether phenol-formaldehyde modified thermosetting foam product characterized by a low flame spread and smoke properties, which method comprises:

(a) reacting, under substantially anhydrous conditions, 100 parts of a benzylic-ether phenol-formaldehyde resin, having a hydroxyl number of from about 400 to 600, with from about 50 to 150 parts by weight per 100 parts of the benzylic-ether phenol-formaldehyde resin in the presence of a boric acid catalyst at a temperature of less than about 100° F. and a pH of from about 4.0 to 6.5, to form a benzylic-ether phenol resin prepolymer; and (b) reacting, in the presence of a blowing amount of a blowing agent to form a foamable mass, and a catalytic amount of an organometallic catalyst, which is not affected by the pH of the prepolymer, the prepolymer with from about 50 to 200 parts by weight of a methylene diphenyl diisocyanate in an exothermic reaction, to provide the further condensation of the phenolic resin prepolymer and the reaction of the isocyanate with the prepolymer, to provide a low-friability, substantially closed-cell, phenolic modified thermosetting foam product composed substantially of acid methylene linkages.

18. A method of preparing a nonfriable, closed-cell, benzylic-ether phenol-formaldehyde modified thermosetting foam product characterized by a low flame spread and smoke properties, which method comprises:

(a) reacting, under substantially anhydrous conditions, 100 parts of a benzylic-ether phenol-formaldehyde resin, having a hydroxyl number of from about 400 to 600, with from about 50 to 150 parts by weight per 100 parts of the benzylic-ether phenol-formaldehyde resin in the presence of a boric acid catalyst at a temperature of less than about 100° F. and a pH of from about 4.0 to 6.5, and with a sufficient amount of melamine to react with substantially all of the free formaldehyde of the phenolic-formaldehyde resin and mixing the resin, melamine and weak acid catalyst for a period of about 6 to 24 hours, to form a benzylic-ether phenol resin prepolymer; and (b) reacting, in the presence of a blowing amount of a blowing agent to form a foamable mass, and a catalytic amount of an organometallic catalyst, which is not affected by the pH of the prepolymer, the prepolymer with from about 50 to 200 parts by weight of a methylene diphenyl diisocyanate in an exothermic reaction, to provide the further condensation of the phenolic resin prepolymer and the reaction of the isocyanate with the prepolymer, to produce a low-friability, substantially closed-cell, phenolic modified thermosetting foam product composed substantially of acid methylene linkages.

* * * * *